US008611282B2

(12) United States Patent
Kim et al.

(10) Patent No.: US 8,611,282 B2
(45) Date of Patent: Dec. 17, 2013

(54) METHOD FOR RECEIVING DOWNLINK SIGNAL IN MULTI-ANTENNA WIRELESS COMMUNICATION SYSTEM AND DEVICE THEREFOR

(75) Inventors: Bong Hoe Kim, Anyang-si (KR); Byeong Woo Kang, Anyang-si (KR); Yu Jin Noh, Anyang-si (KR); Dong Wook Roh, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 13/320,495

(22) PCT Filed: Jul. 19, 2010

(86) PCT No.: PCT/KR2010/004703
§ 371 (c)(1),
(2), (4) Date: Nov. 14, 2011

(87) PCT Pub. No.: WO2011/008059
PCT Pub. Date: Jan. 20, 2011

(65) Prior Publication Data
US 2012/0057562 A1    Mar. 8, 2012

Related U.S. Application Data

(60) Provisional application No. 61/226,283, filed on Jul. 17, 2009.

(30) Foreign Application Priority Data

Jul. 16, 2010 (KR) ........................ 10-2010-0068931

(51) Int. Cl.
*H04W 4/00* (2009.01)

(52) U.S. Cl.
USPC .......................................... 370/328; 370/337

(58) Field of Classification Search
USPC ................... 370/328, 329, 334, 503
See application file for complete search history.

(56) References Cited

U.S. PATENT DOCUMENTS

| 8,422,479 | B2 * | 4/2013 | Suo et al. ...................... 370/347 |
| 2008/0212701 | A1 | 9/2008 | Pan et al. | |
| 2009/0046800 | A1 * | 2/2009 | Xu et al. ........................ 375/267 |
| 2010/0150013 | A1 * | 6/2010 | Hara et al. ..................... 370/252 |

(Continued)

OTHER PUBLICATIONS

Research in Motion, UK Limited, "Control Signal Design for Rel-9 Dual Layer BF Transmission", 3GPP TSG RAN WG1 Meeting #57bis, R1-092412, Jun. 29-Jul. 3, 2009, pp. 1-8.

(Continued)

*Primary Examiner* — Andrew Lee
(74) *Attorney, Agent, or Firm* — Birch, Stewart, Kolasch & Birch, LLP

(57) ABSTRACT

Disclosed in a method for a terminal to receive a downlink signal in a multi user MIMO (MU-MIMO) wireless communication system. More specifically, the method comprises the steps of: receiving downlink control information (DCI) from a base station; obtaining a parameter for a downlink demodulating-reference signal (DM-RS) included in the downlink control information; receiving the downlink DM-RS specified to the terminal on the basis of the parameter; and receiving a downlink data signal on the basis of the downlink DM-RS specified in the terminal, wherein the parameter includes information on a rank which is set in the terminal and a logical antenna port in which the downlink DM-RS is defined.

10 Claims, 11 Drawing Sheets

(56) References Cited

U.S. PATENT DOCUMENTS

| | | | |
|---|---|---|---|
| 2010/0172256 A1* | 7/2010 | Mallik et al. | 370/252 |
| 2010/0246527 A1* | 9/2010 | Montojo et al. | 370/330 |
| 2011/0149886 A1* | 6/2011 | Xu et al. | 370/329 |
| 2011/0205930 A1* | 8/2011 | Rahman et al. | 370/252 |
| 2011/0292903 A1* | 12/2011 | Jongren et al. | 370/329 |
| 2011/0299449 A1* | 12/2011 | Kwon et al. | 370/312 |
| 2012/0106501 A1* | 5/2012 | Kishiyama et al. | 370/330 |
| 2012/0190396 A1* | 7/2012 | Oyama | 455/517 |
| 2012/0213147 A1* | 8/2012 | Noh et al. | 370/315 |

OTHER PUBLICATIONS

Texas Instruments, "Further Analysis on Uplink SU-MIMO for E-UTRA", 3GPP TSG RAN WG1 #55, R1-084445, Nov. 10-14, 2008, pp. 1-8.

\* cited by examiner

FIG. 2
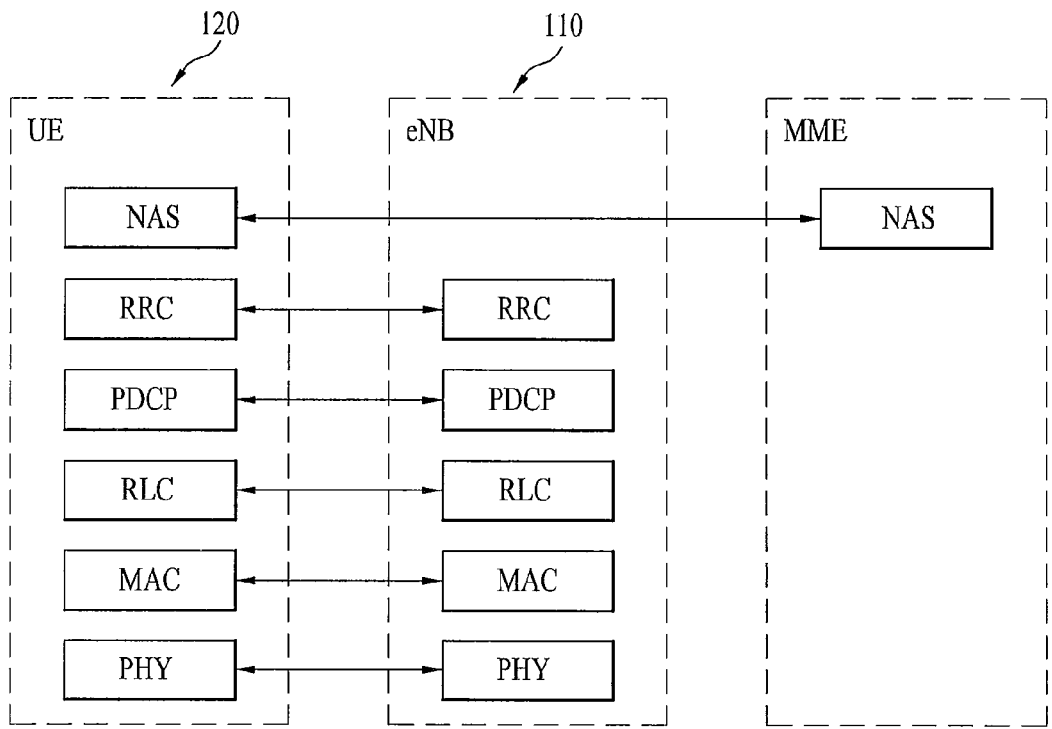
(a) control-plane protocol stack
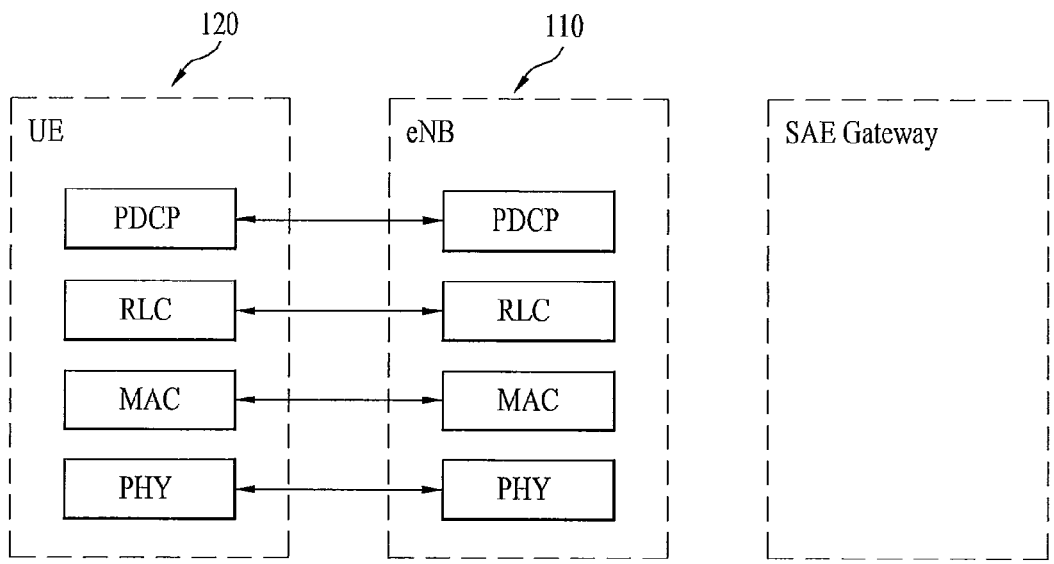
(b) user-plane protocol stack

METHOD FOR RECEIVING DOWNLINK SIGNAL IN MULTI-ANTENNA WIRELESS COMMUNICATION SYSTEM AND DEVICE THEREFOR

CROSS REFERENCE TO RELATED APPLICATIONS

This application is a National Phase of International Application No. PCT/KR2010/004703 filed on Jul. 19, 2010 which claims the benefit under 35 U.S.C. §119(e) of U.S. Provisional Application No. 61/226,283 filed on Jul. 17, 2009 and to Patent Application No. 10-2010-0068931 filed in the Republic of Korea, on Jul. 16, 2010. The entire contents of all of the above applications are hereby incorporated by reference.

TECHNICAL FIELD

The present invention relates to a wireless communication system, and more particularly, to a method for receiving a downlink signal in a user equipment of a multi-antenna wireless communication system and a device therefor.

BACKGROUND ART

Multiple-Input Multiple-Output (MIMO) means a scheme that uses a plurality of transmitting antennas and a plurality of receiving antennas. Transmission and reception efficiency can be improved by the MIMO scheme. Namely, a transmitting side or receiving side of a wireless communication system can enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay node. According to the MIMO antenna technology, it is possible to overcome limitation of a transmission rate in mobile communication according to the related art where a single antenna is used.

A schematic view of a general MIMO communication system is illustrated in FIG. 1. Referring to FIG. 1, $N_T$ number of transmitting antennas are provided at a transmitting side while $N_R$ number of receiving antennas are provided at a receiving side. If a plurality of antennas are used at both the transmitting side and the receiving side, theoretical channel transmission capacity is more increased than that a plurality of antennas are used at any one of the transmitting side and the receiving side. Increase of the channel transmission capacity is proportional to the number of antennas. Accordingly, the transmission rate is improved, and frequency efficiency is also improved. Supposing that a maximum transmission rate is $R_o$ when a single antenna is used, a transmission rate corresponding to a case where multiple antennas are used can be increased theoretically, as expressed by the following Equation 1, as much as a value obtained by multiplying a maximum transmission rate $R_o$ by a rate increase $R_i$. In this case, $R_i$ corresponds to a smaller value of $N_T$ and $N_R$.

$$R_i = \min(N_T, N_R) \qquad \text{[Equation 1]}$$

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 1, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information can be expressed by a vector shown in Equation 2 as follows.

$$s = [s_1, s_2, \ldots, s_{N_T}]^T \qquad \text{[Equation 2]}$$

In the mean time, different kinds of transmission power can be applied to each of the transmission information $s_1, s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{s}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the mean time, it is considered that a weight matrix W is applied to the information vector $\hat{s}$ of which transmission power is controlled, so as to obtain $N_T$ transmitting signals $x_1, x_2, \ldots x_{N_T}$. In this case, the weight matrix serves to properly distribute the transmission information to each antenna depending on a transmission channel status. Such transmitting signals $x_1, x_2, \ldots x_{N_T}$ can be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_J \\ \vdots \\ \hat{s}_{N_T} \end{bmatrix}$$

$$= W\hat{s}$$

$$= WPs$$

Generally, a rank in the channel matrix may physically mean the maximum number of rows or columns that can transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H) \leq \min(N_T, N_R)$$ [Equation 6]

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that can transmit different kinds of information. Accordingly, the channel matrix H can be expressed by the following Equation 7.

$$\text{\# of streams} \leq \text{rank}(H) \leq \min(N_T, N_R)$$ [Equation 7]

In this case, "# of streams" represents the number of streams. Meanwhile, it is to be understood that one stream can be transmitted through one or more antennas.

Various methods for corresponding one or more streams to several antennas may exist. These methods can be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme may exist.

DISCLOSURE

Technical Problem

Accordingly, the present invention has been devised to obviate one or more problems due to limitations and disadvantages of the related art, and an object of the present invention is to provide to a method for receiving a downlink signal in a user equipment of a multi-antenna wireless communication system and a device therefor.

Technical Solution

To achieve these objects and other advantages and in accordance with the purpose of the invention, as embodied and broadly described herein, a method for receiving a downlink signal in a user equipment of a multi user MIMO (MU-MIMO) wireless communication system comprises the steps of receiving downlink control information (DCI) from a base station; acquiring a parameter for a downlink demodulating-reference signal (DM-RS) included in the downlink control information; receiving the downlink DM-RS specified in the user equipment on the basis of the parameter; and receiving a downlink data signal on the basis of the downlink DM-RS specified in the user equipment, wherein the parameter includes information on a rank which is set in the user equipment and information on logical antenna ports in which the downlink DM-RS is defined. In this case, it is preferable that the rank set in the user equipment is maximum 2, and the number of logical antenna ports defined for the user equipment is 2.

More preferably, if the rank set in the user equipment is 1, the information on logical antenna ports include one index information of the two logical antenna ports. Moreover, the information on logical antenna ports is transmitted through a field of 1 bit included in the downlink control information.

In the mean time, the indexes of the logical antenna ports set in the user equipment are defined continuously, and the information on logical antenna ports is the minimum one of the indexes of the logical antenna ports set in the user equipment.

In another aspect of the present invention, a method for receiving a downlink signal in a user equipment of a multi user MIMO (MU-MIMO) wireless communication system comprises the steps of receiving downlink control information (DCI) from a base station; acquiring information on logical antenna ports set in the user equipment and included in the downlink control information; receiving a downlink demodulating-reference signal (DM-RS) specified in the user equipment on the basis of the information on logical antenna ports; and receiving a downlink data signal on the basis of the downlink DM-RS specified in the user equipment, wherein the information on logical antenna ports includes a minimum one of indexes of the logical antenna ports set in the user equipment and an offset value which is the number of logical antenna ports set continuously starting from the logical antenna port of the minimum index.

In still another aspect of the present invention, a user equipment in a multi user MIMO (MU-MIMO) wireless communication system comprises a receiving module receiving downlink control information (DCI) from a base station; and a processor acquiring a parameter for a downlink demodulating-reference signal (DM-RS) included in the downlink control information, wherein the receiving module receives the downlink DM-RS specified in the user equipment on the basis of the parameter, and receives a downlink data signal on the basis of the downlink DM-RS specified in the user equipment, and the parameter includes information on a rank which is set in the user equipment and information on logical antenna ports in which the downlink DM-RS is defined.

In further still another aspect of the present invention, a user equipment in a multi user MIMO (MU-MIMO) wireless communication system comprises a receiving module receiving downlink control information (DCI) from a base station; and a processor acquiring information on logical antenna ports set in the user equipment and included in the downlink control information, wherein the receiving module receives a downlink demodulating-reference signal (DM-RS) specified in the user equipment on the basis of the information on logical antenna ports, and receives a downlink data signal on the basis of the downlink DM-RS specified in the user equipment, and the information on logical antenna ports includes a minimum one of indexes of the logical antenna ports set in the user equipment and an offset value which is the number of logical antenna ports set continuously starting from the logical antenna port of the minimum index.

Advantageous Effects

According to the embodiments of the present invention, in a multi-antenna wireless communication system, a user equipment can effectively receive a downlink reference signal.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between one user equipment and E-UTRAN based on the 3GPP radio access network standard;

BEST MODE FOR CARRYING OUT THE INVENTION

Figure 1:
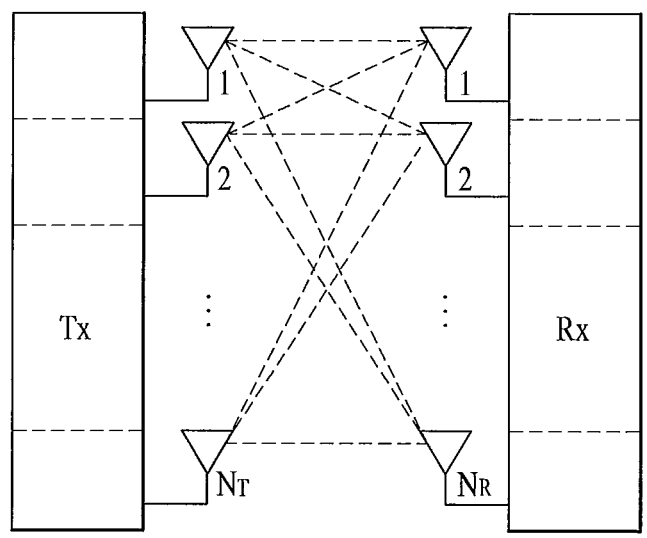
FIG. 1 is a schematic diagram illustrating a general MIMO communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

In this specification, although the embodiment of the present invention will be described based on an LTE system and an LTE-A system, the LTE system and the LTE-A system are only exemplary and may be applied to all communication systems corresponding to the aforementioned definition. Also, although the embodiment of the present invention will herein be described based on FDD mode, the FDD mode is only exemplary, and the embodiment of the present invention may easily be applied to H-FDD mode or TDD mode through modifications.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer located above the physical layer via a transport channel. Data are transferred between the medium access control layer and the physical layer via the transport channel. Data are transferred between the physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 Mhz and provides a downlink or uplink transmission service to several user equipments. At this time, different cells may be configured to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
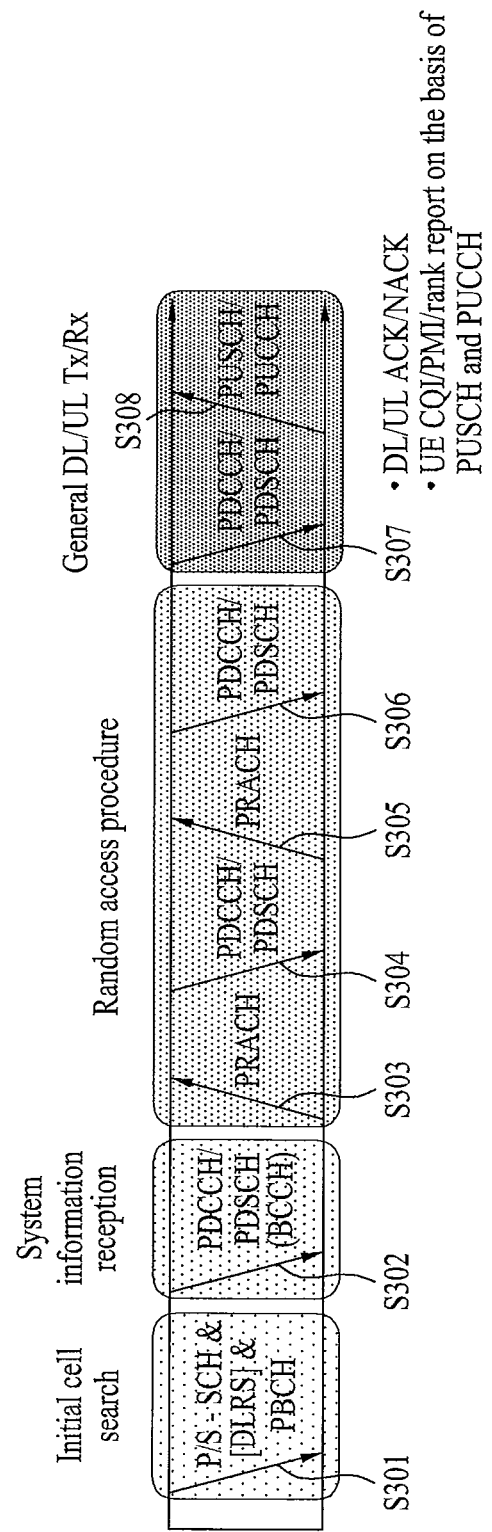
FIG. 3 is a diagram illustrating physical channels used in a 3GPP system and a general method for transmitting a signal using the physical channels.

FIG. 3 is a diagram illustrating physical channels used in a 3GPP system and a method for transmitting a general signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within the cell by receiving a physical broadcast channel from the base station. Meanwhile, the user equipment may identify the status of a downlink channel by receiving a downlink reference signal (DL RS) in the initial cell search step.

The user equipment which has finished the initial cell search may acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as general a procedure of transmitting uplink/downlink signals. In particular, the user equipment receives downlink control information (DCI) through the PDCCH. The DCI includes control information such as resource allocation information on the user equipment and has different formats depending on its purpose of use.

Meanwhile, the control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Figure 4:
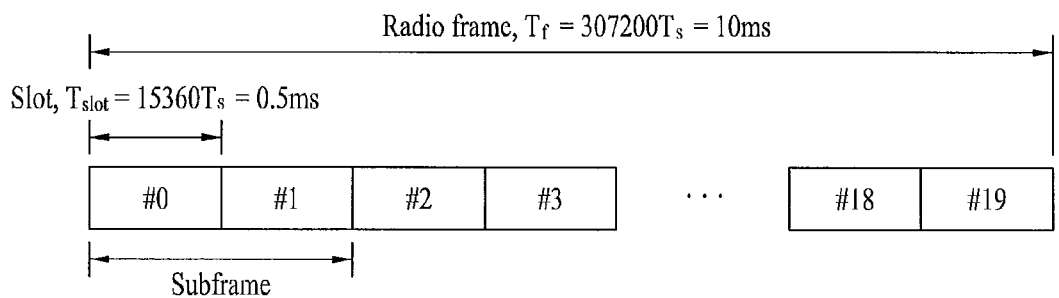
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms (327200·$T_s$) and includes 10 subframes of an equal size. Each sub frame has a length of 1 ms and includes two slots. Each slot has a length of 0.5 ms (15360·$T_s$). In this case, $T_s$ represents a sampling time, and is expressed by $T_s=1/(15\ kHz \times 2048)=3.2552\times10^{-8}$ (about 33 ns). The slot includes a plurality of OFDM symbols in a time domain, and includes a plurality of resource blocks (RBs) in a frequency domain. In the LTE system, one resource block includes twelve(12) subcarriers X seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
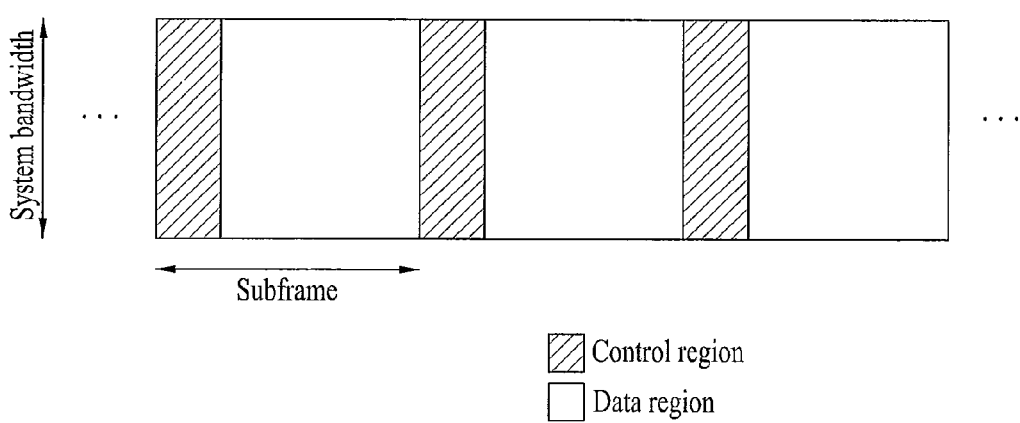
FIG. 5 is a diagram illustrating a structure of a downlink subframe used in an LTE system.

FIG. 5 is a diagram illustrating a structure of a downlink subframe used in an LTE system.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region may have a size set independently per subframe. The control region is used to transmit L1/L2 (layer 1/layer 2) control signals. The data region is used to transmit downlink traffic.

Figure 6:
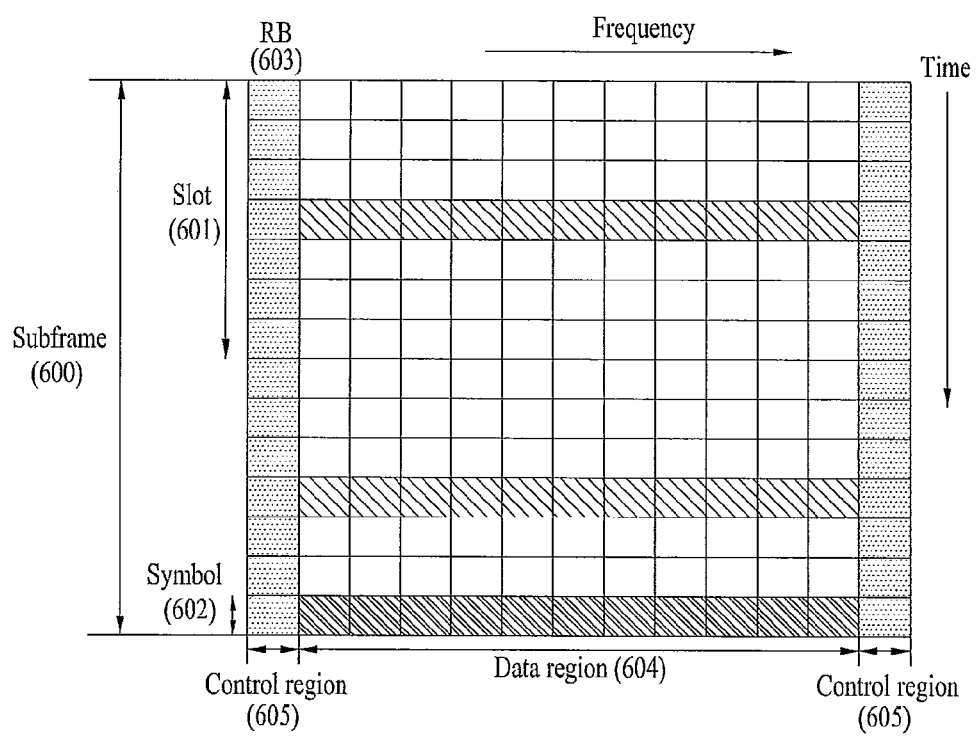
FIG. 6 is a diagram illustrating a structure of an uplink subframe used in an LTE system.

FIG. 6 is a diagram illustrating a structure of an uplink subframe used in an LTE system.

Referring to FIG. 6, a subframe 600 having a length of 1 ms, which is a basic unit of LTE uplink transmission, includes two slots 601 of 0.5 ms. In case of normal cyclic prefix (CP) length, each slot includes seven symbols 602, each of which corresponds to each SC-FDMA symbol. A resource block (RB) 603 is a resource allocation unit corresponding to twelve (12) subcarriers in a frequency domain and one slot in a time domain. A structure of an LTE uplink subframe is classified into a data region 604 and a control region 605. In this case, the data region means a series of communication resources used for transmission of data such as voice and packet transmitted to each user equipment, and corresponds to the other resources except for the control region within the subframe. The control region means a series of communication resources used for transmission of downlink channel quality report, ACK/NACK of a downlink signal, and uplink scheduling request from each user equipment.

As illustrated in FIG. 6, an interval 606 for which a sounding reference signal may be transmitted within one subframe is a duration where SC-FDMA symbol at the last location on a time axis of one subframe exists, and the sounding reference signal is transmitted through a data transmission band on a frequency axis. Sounding reference signals of several user equipments, which are transmitted to the last SC-FDMA of the same subframe, may be identified by a cyclic shift value. Also, an interval 607 for which a demodulation (DM) sounding reference signal may be transmitted within one subframe is a duration where middle SC-FDMA symbols at one slot, i.e., the fourth SC-FDMA symbol and the eleventh SC-FDMA symbol exist, and the DM sounding reference signal is transmitted through a data transmission band on a frequency axis.

Figure 7:
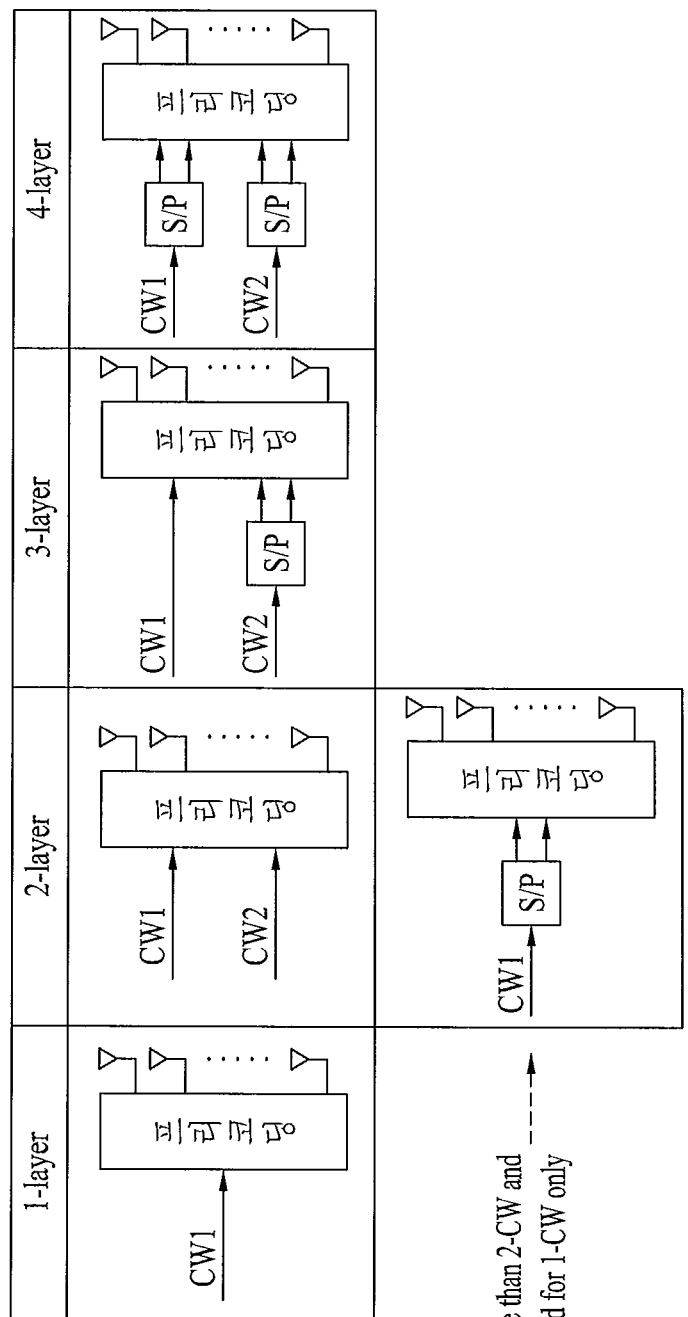
FIG. 7 is a diagram illustrating various methods of mapping a codeword into a layer.

FIG. 7 is a diagram illustrating various methods of mapping a codeword into a layer.

Referring to FIG. 7, various methods for mapping a codeword into a layer are provided. When MIMO transmission is performed, a transmitter should determine the number of codewords depending on layers. The number of codewords is determined referring to the number of data sequences and a rank of a channel, which are different from those of the number of layers. The transmitter needs to map the codewords into the layers.

Hereinafter, the reference signal will be described in more detail. In general, for channel measurement, the reference signal already known by the transmitter and the receiver is transmitted from the transmitter to the receiver together with data. The reference signal provides a modulation scheme as well as channel measurement, so that a demodulation process is performed. The reference signal is classified into a dedicated reference signal (DRS) for the base station and a specific user equipment, i.e., a user equipment specific reference signal and a common reference signal (CRS) for all the user equipments.

For transmission of downlink data from the base station to the user equipment, the base station may transmit a downlink DM-RS for channel estimation between the user equipment and the base station. The base station transmits the downlink DM-RS to the user equipment as the user equipment specific reference signal, and the downlink DM-RS is generated using a pseudo-random sequence c(n) as expressed by the following Equations 8 and 9.

$$r_{n_s}(m) = \frac{1}{\sqrt{2}}(1 - 2 \cdot c(2m)) + j\frac{1}{\sqrt{2}}(1 - 2 \cdot c(2m+1)),$$ [Equation 8]

$$m = 0, 1, \ldots, 12N_{RB}^{PDSCH} - 1$$

$$c(n) = (x_1(n + N_C) + x_2(n + N_C)) \bmod 2$$ [Equation 9]
$$x_1(n + 31) = (x_1(n + 3) + x_1(n)) \bmod 2$$
$$x_2(n + 31) = (x_2(n + 3) + x_2(n + 2) + x_2(n + 1) + x_2(n)) \bmod 2$$

In the Equation 9, Nc is 1600, and the first m-sequence has an initial value such as $x_1(0)=1$ and $x_1(n)=0$ (n is a value between 1 and 30). The second m-sequence value is defined as $c_{init}=\Sigma_{i=0}^{30} x_2(i) \cdot 2^i$, and is determined depending on its usage.

The reference signal sequence of the Equation 8 may be applied to all of single cell single user MIMO transmission, multi-cell multi user MIMO transmission, multi-cell single user MIMO transmission, and multi-cell multi-user MIMO transmission.

In the MIMO transmission mode, the initial value $c_{init}$ of the second m-sequence used to generate the pseudo-random sequence in the Equation 9 may be defined separately. In particular, $c_{init}$ further includes a scramble identification parameter $N_{DRS}$ as a factor.

In this case, $N_{DRS}$ is set to a value of 1 if the cell-specific reference signal and DM-RS of the LTE system exist in the same OFDM symbol, and may be set to a value of 0 in the other cases. Also, $N_{DRS}$ may separately be signaled from the base station through a DCI format 2B received through the PDCCH. $N_{ID}^{cell}$ may mean cell ID or group ID of a user group in the multi-cell multi-user MIMO mode.

Finally, although SPS-RNTI is used in semi-persistent transmission and C-RNTI is used in the other transmission not the semi-persistent transmission, $n_{RNTI}$ may be set to 0 depending on a multiplexing scheme of the DM-RS.

When the number of antenna ports for DM-RS transmission in the LTE system is 2, if the multiplexing scheme is a frequency division multiplexing scheme, $c_{init}$ may be defined as expressed by the following Equation 10.

$$c_{init}=N_{DRS}2^{30}+(\lfloor n_s/2 \rfloor+1) \cdot (2N_{ID}^{cell}+1) \cdot 2^{16}+n_{RNTI}$$ [Equation 10]

Also, $c_{init}$ for supporting the single cell multi-user MIMO mode transmission may be defined as any one of the following Equations 11 to 13 by setting $n_{RNTI}$ to 0 if the multiplexing scheme for the antenna ports is a frequency division multiplexing scheme.

$$c_{init}=N_{DRS}2^{30}+(\lfloor n_s/2 \rfloor+1) \cdot (2N_{ID}^{cell}+1) \cdot 2^{16}$$ [Equation 11]

$$c_{init}=N_{DRS}2^{14}+(\lfloor n_s/2 \rfloor+1) \cdot (2N_{ID}^{cell}+1) \cdot$$ [Equation 12]

$$c_{init}=N_{DRS}+(\lfloor n_s/2 \rfloor+1) \cdot (2N_{ID}^{cell}+1) \cdot 2^{16}$$ [Equation 13]

In addition, parameters such as a cyclic shift value for transmitting the downlink DM-RS from the base station and rank information are signaled through downlink control information transmitted through the PDCCH. However, if a multi-user MIMO (MU-MIMO) scheme defined in the LTE-A specification is used, since several users share a spatial resource, the user equipment cannot identify a DM-RS used by itself through the cyclic shift value and the rank information only. Accordingly, the base station needs to signal information on logical antenna ports for defining the DM-RS to the user equipments together with rank information for MU-MIMO. Hereinafter, a signaling method for transmitting a DM-RS to user equipments multiplexed for MU-MIMO will be described.

<First Embodiment>

First of all, it is assumed that ranks of multiplexed user equipments are all fixed to 1. In this case, rank information for each of the user equipments is not needed to be transmitted through the PDCCH. Information on (logical) antenna ports in which the DM-RS is defined is only required as information for receiving a DM-RS in the user equipment. If D number of antenna ports are defined for the DM-RS, the information on antenna ports has a size of $\lceil \log_2 D \rceil$ bit. For example, if two antenna ports are defined as those for the DM-RS are defined, the size of the information on antenna ports may be signaled as information of 1 bit size. In other words, a field of $\lceil \log_2 D \rceil$ bit size may be added to the DCI format transmitted from the base station, whereby the information on antenna ports may be signaled directly.

<Second Embodiment>

Next, it is assumed that ranks of multiplexed user equipments are fixed to maximum 2. In this case, the base station should signal rank information of each user equipment by using 1 bit information together with information on total ranks for MU-MIMO. Also, the base station should signal the information on antenna ports to the user equipment. However, the following methods are suggested to reduce signaling overhead.

First of all, if the base station discontinuously defines antenna ports per user equipment to transmit the DM-RS to each user equipment, it may signal logical antenna ports for the DM-RS, which are defined for each user equipment, to each user equipment. In this case, if D number of antenna ports are defined for the DM-RS, the information on antenna ports has a size of $\lceil \log_2 D \rceil$ bit.

For example, if a total of eight antenna ports from index 0 to index 7 are set as those for DM-RS, the base station may signal bitmap information "01000100" to a random user equipment. In this case, the user equipment may identify that antenna ports of index 1 and index 5 have been allocated thereto, and may also identify that the base station indirectly transmits downlink data to the user equipment by using two layers.

Next, the case where antenna ports for DM-RS are continuously defined per user equipment will be described. For example, if two ranks are transmitted to one user equipment, i.e., if the base station transmits a downlink signal to one user equipment through two layers, the Pth antenna port and the P+1th antenna port may be allocated as those for receiving the DM-RS in the user equipment. Under the above assumption, examples of the signaling scheme may include 1) a signaling scheme that includes rank information of each user equipment and antenna port information (in this case, antenna port information means minimum index of antenna ports allocated to the user equipment), and 2) a signaling scheme that includes antenna port information and offset value based on the antenna port information. Each signaling scheme will be described with reference to FIG. 8 and FIG. 9. In particular, it is assumed in FIG. 8 and FIG. 9 that logical antenna ports from index 0 to index 7 are set as those for DM-RS transmission from the base station and a total of five user equipments are multiplexed for MU-MIMO.

Figure 8:
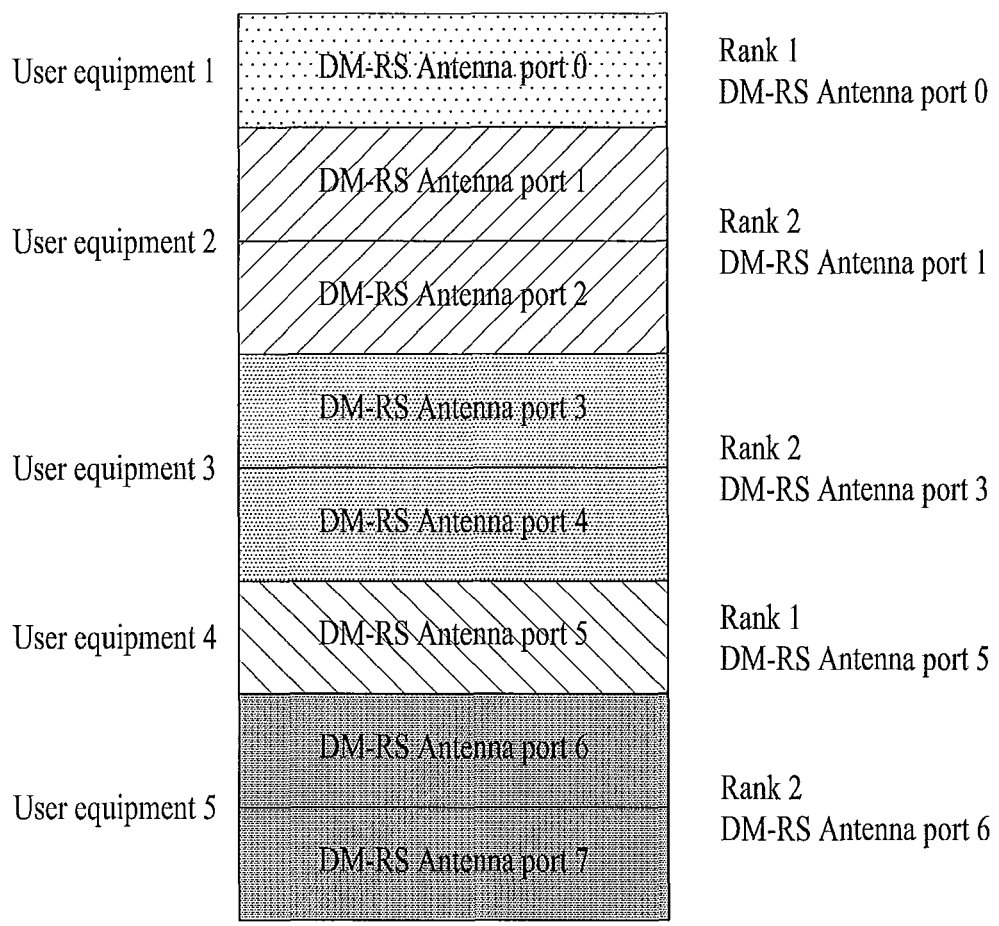
FIG. 8 is a diagram illustrating a downlink DM-RS signaling scheme according to the second embodiment of the present invention.

FIG. 8 is a diagram illustrating a downlink DM-RS signaling scheme according to the second embodiment of the present invention.

Referring to FIG. 8, the base station signals rank information scheduled for each user equipment and minimum index of antenna ports, which are allocated to the user equipment, to all the user equipments multiplexed for MU-MIMO. For example, rank scheduled for the user equipment 2 may be 2 and the minimum index of the antenna ports allocated to the user equipment 2 may be signaled as 1. In this case, the user equipment 2 may identify that logical antenna ports for receiving the DM-RS are defined as indexes 1 and 2, based on information as to that the base station transmits downlink data to the user equipment 2 through two layers.

Likewise, rank scheduled for the user equipment 4 may be 1 and the minimum index of the antenna ports allocated to the user equipment 4 may be signaled as 5. In this case, the user equipment 4 may identify that logical antenna ports for receiving the DM-RS are defined as index 5, based on information as to that the base station transmits downlink data to the user equipment 4 through one layer. However, in case of the user equipment 4, although the maximum rank is 2, since the scheduled rank is 1, the information on antenna ports may be signaled as follows.

Since the maximum rank is 2, the base station may transmit only one of two codewords. Accordingly, the base station does not transmit the codeword to the user equipment 4 but transmits the PDCCH corresponding to the codeword. In this case, the base station may indirectly signal the information on logical antenna ports through a previously defined field of the DCI transmitted through the PDCCH. In this case, all fields of $\lceil \log_2 D \rceil$ bit size defined in the current DCI format may be used as the previously defined field. In particular, if the number of antenna ports is 2, information of 1 bit size such as NDI field may be used.

For example, if indexes 7 and 8 are defined for the user equipment 4 as logical antenna ports for the DM-RS, the user equipment may identify that index 7 is defined as an antenna port for the DM-RS if the NDI field of the DCI corresponding to non-active codeword is 0. Likewise, the user equipment 4 may identify that index 8 is defined as an antenna port for the DM-RS if the NDI field of the DCI corresponding to non-active codeword is 1.

Figure 9:
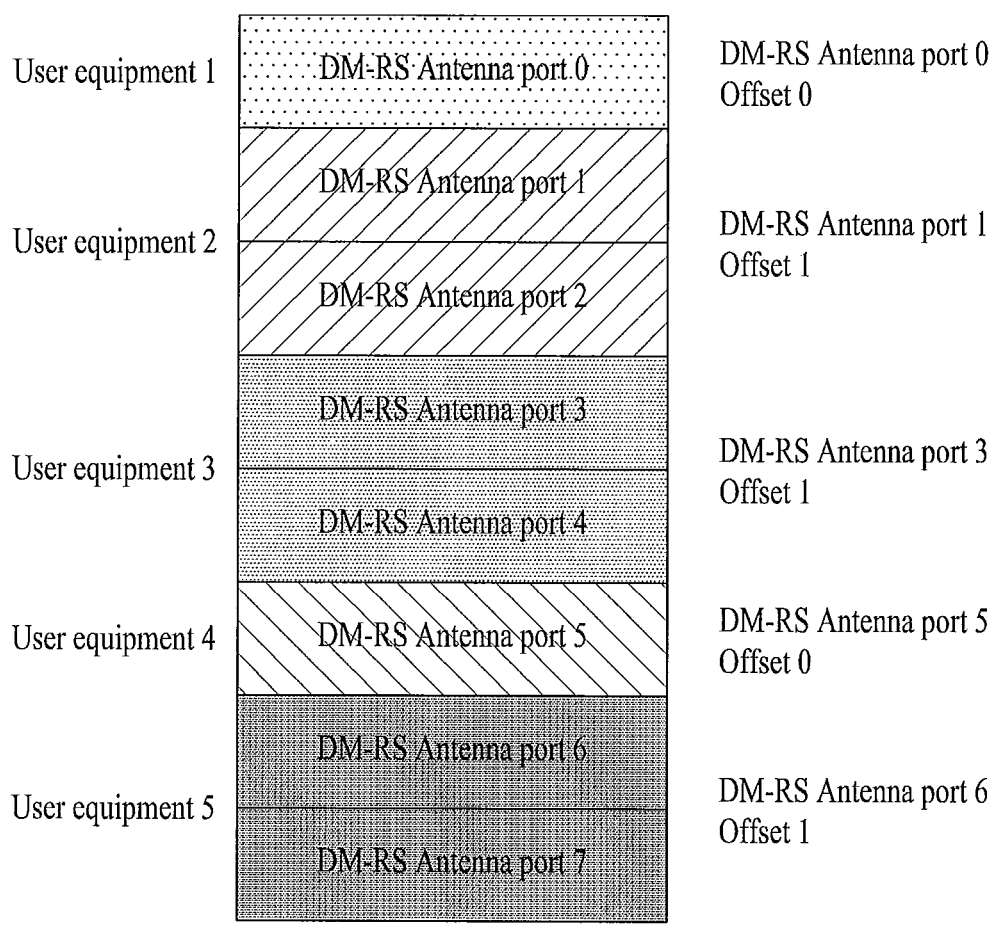
FIG. 9 is a diagram illustrating a downlink DM-RS signaling scheme according to the second embodiment of the present invention.

FIG. 9 is a diagram illustrating a downlink DM-RS signaling scheme according to the second embodiment of the present invention.

Referring to FIG. 9, the base station signals antenna port information and an offset value based on the antenna port information to all the user equipments multiplexed for MU-MIMO. For example, antenna port information for the user equipment 2 may be index 1 and the offset value based on the antenna port information may be signaled as 1. In this case, the user equipment 2 may identify that the antenna port 2 is defined for DM-RS transmission based on the offset value together with the antenna port of index 1. Moreover, since the base station transmits the DM-RS to the user equipment 2 by using two antenna ports, the user equipment 2 may indirectly acquire information as to that rank is 2.

Also, antenna port information for the user equipment 4 may be index 5 and the offset value based on the antenna port information may be signaled as 0. In this case, the user equipment 5 may identify that the antenna port of index 5 is only defined for DM-RS transmission based on the offset value of 1. Moreover, since the base station transmits the DM-RS to the user equipment 5 by using one antenna port, the user equipment 5 may indirectly acquire information as to that rank is 1.

<Third Embodiment>

Finally, it is assumed that there is no limitation in rank of the multiplexed user equipments. If D number of antenna ports are defined for DM-RS transmission, bit information of $\lceil \log_2 D \rceil$ size is basically required for rank information of each user equipment. Also, since logical antenna port information for the DM-RS defined for the user equipment is also required, it is necessary to reduce signaling overhead.

First of all, if antenna ports are discontinuously defined for DM-RS transmission per user equipment in the same manner as the second embodiment, the base station may signal antenna ports, which are allocated to each user equipment, as bitmap information. For example, if a total of eight antenna ports from index 0 to index 7 are set as those for the DM-RS, the base station may signal bitmap information "01110100" to the user equipment. In this case, the user equipment may identify that logical antenna ports of index 1, index 2, index 4 and index 5 have been allocated thereto, and may also identify that the base station indirectly transmits data to the user equipment by using four layers.

Next, the case where antenna ports for DM-RS are continuously defined per user equipment will be described. For example, if there is no limitation in ranks of the user equipment, in the same manner as the second embodiment, examples of the signaling scheme include 1) a signaling scheme that includes rank information of each user equipment and antenna port information (in this case, antenna port information means minimum index of antenna ports allocated to the user equipment), and 2) a signaling scheme that includes antenna port information and offset value based on the antenna port information. Each signaling scheme will be described with reference to FIG. 10 and FIG. 11.

Figure 10:
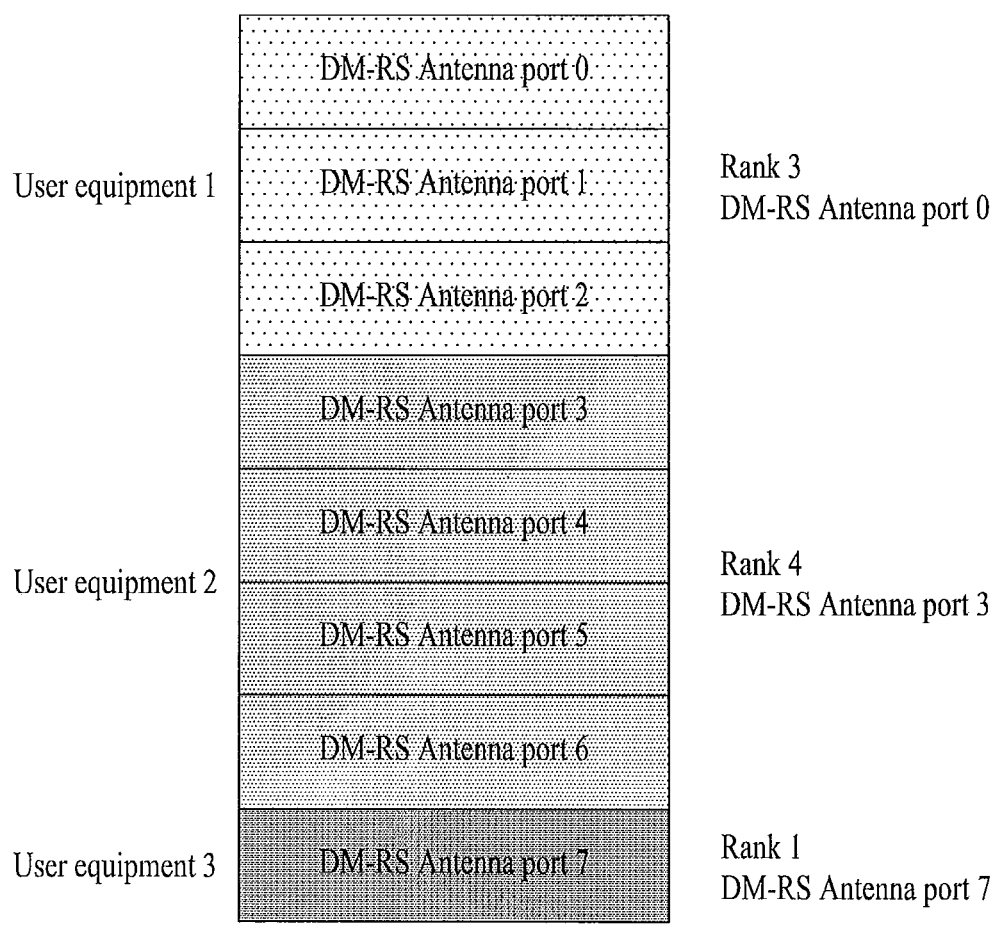
FIG. 10 is a diagram illustrating a downlink DM-RS signaling scheme according to the third embodiment of the present invention.

FIG. 10 is a diagram illustrating a downlink DM-RS signaling scheme according to the third embodiment of the present invention.

Referring to FIG. 10, the base station signals rank information scheduled for each user equipment and minimum index of antenna ports, which are allocated to the user equipment, to all the user equipments multiplexed for MU-MIMO. For example, rank scheduled for the user equipment 2 may be 4 and the minimum index of the antenna ports allocated to the user equipment 2 may be signaled as 3. In this case, the user equipment 2 may identify that logical antenna ports for the DM-RS are defined as indexes 3 to 6, based on information as to that the base station transmits downlink data to the user equipment 2 through four layers.

Likewise, rank scheduled for the user equipment 1 may be 3 and the minimum index of the antenna ports allocated to the user equipment 1 may be signaled as 0. In this case, the user equipment 1 may identify that logical antenna ports for the DM-RS are defined as indexes 0 to 2, based on information as to that the base station transmits downlink data to the user equipment 1 through three layers.

Figure 11:
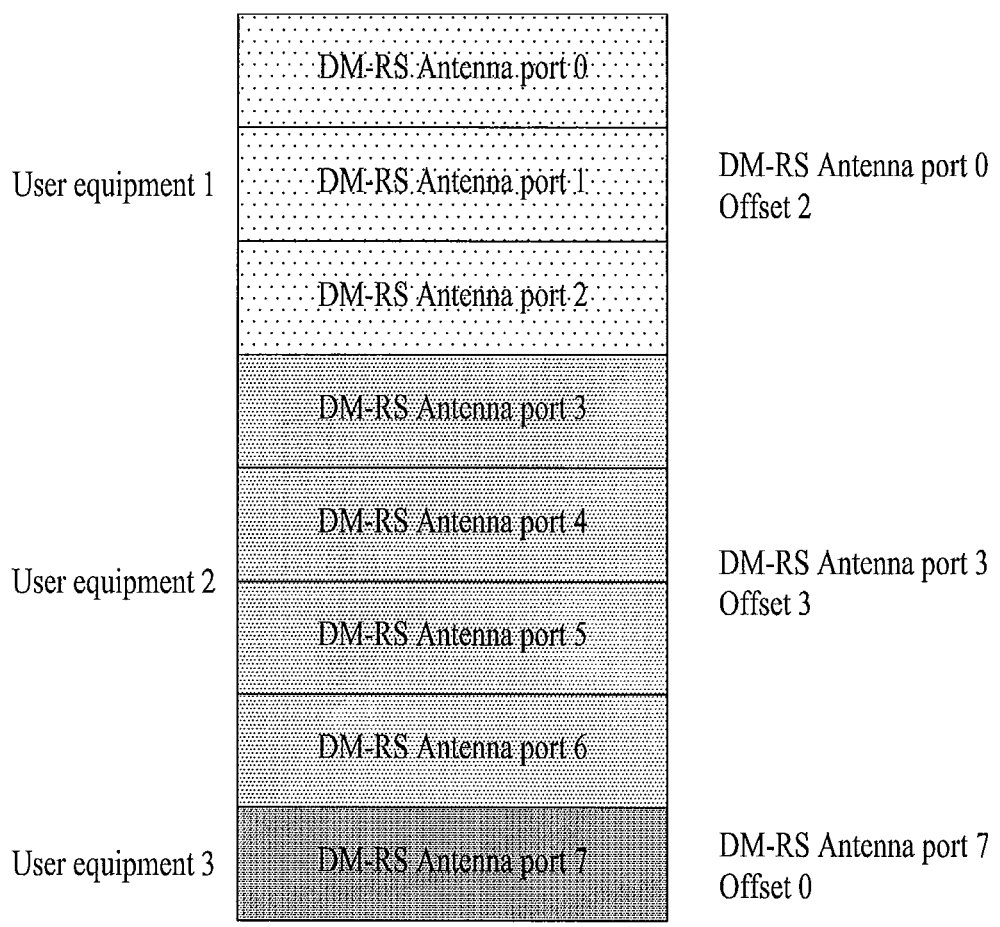
FIG. 11 is a diagram illustrating a downlink DM-RS signaling scheme according to the third embodiment of the present invention.

FIG. 11 is a diagram illustrating a downlink DM-RS signaling scheme according to the third embodiment of the present invention.

Referring to FIG. 11, the base station signals antenna port information and an offset value based on the antenna port information to all the user equipments multiplexed for MU-MIMO. For example, antenna port information for the user equipment 2 may be index 3 and the offset value based on the antenna port information may be signaled as 3. In this case, the user equipment 2 may identify that the antenna ports of indexes 4 to 6 are defined for the DM-RS based on the antenna port of index 3 and the offset value. Moreover, since the base station transmits the DM-RS to the user equipment 2 by using four antenna ports, the user equipment 2 may indirectly acquire information as to that rank is 4.

Also, antenna port information for the user equipment 1 may be index 0 and the offset value based on the antenna port information may be signaled as 2. In this case, the user equipment 1 may identify that the antenna ports of indexes 1 and 2 are defined as those for the DM-RS based on the antenna port of index 0 and the offset value. Moreover, since the base station transmits the DM-RS to the user equipment 5 by using three antenna ports, the user equipment 5 may indirectly acquire information as to that rank is 3.

Figure 12:
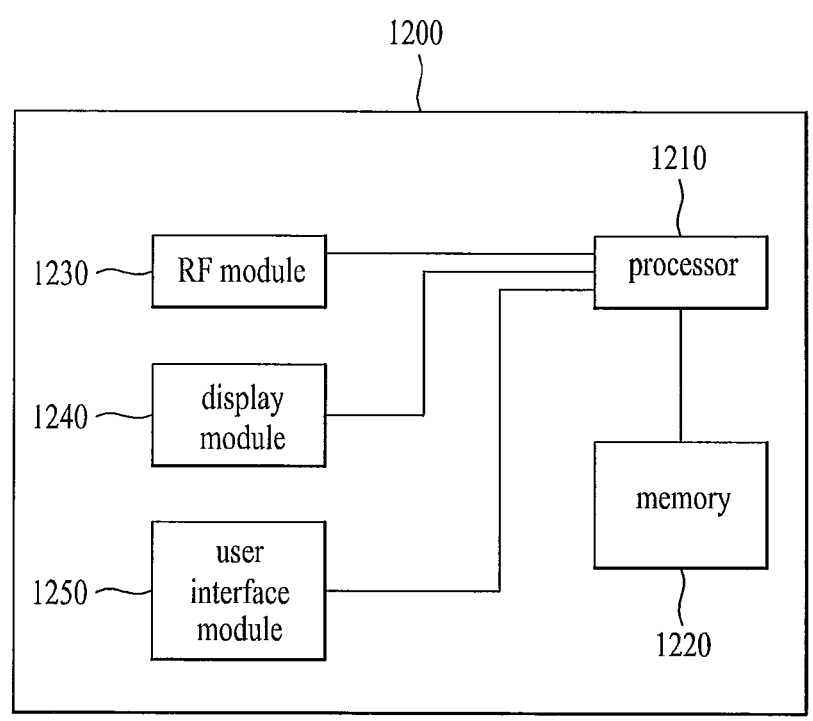
FIG. 12 is a block diagram illustrating a user equipment according to one embodiment of the present invention.

FIG. 12 is a block diagram illustrating a user equipment according to one embodiment of the present invention.

Referring to FIG. 12, the user equipment 1200 includes a processor 1210, a memory 1220, a radio frequency (RF) module 1230, a display module 1240, and a user interface module 1250.

The user equipment 1200 is illustrated for convenience of description, and some of its modules may be omitted. Also, the user equipment 1200 may further include necessary modules. Moreover, some modules of the user equipment 1200 may be divided into segmented modules. The processor 1210 is configured to perform the operation according to the embodiment of the present invention illustrated with reference to the drawings.

In more detail, the processor 1210 may perform the operation required to multiplex a control signal and a data signal. The detailed operation of the processor 1210 will be understood with reference to the description of FIG. 1 to FIG. 11.

The memory 1220 is connected with the processor 1210 and stores an operating system, an application, a program code, and data therein. The RF module 1230 is connected with the processor 1210 and converts a baseband signal to a radio signal or vice versa. To this end, the RF module 1230 performs analog conversion, amplification, filtering and frequency uplink conversion, or their reverse processes. The display module 1240 is connected with the processor 1210 and displays various kinds of information. Examples of the display module 1240 include, but not limited to, a liquid crystal display (LCD), a light emitting diode (LED), and an organic light emitting diode (OLED). The user interface module 1250 is connected with the processor 1210, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

Industrial Applicability

Although the method for receiving a downlink signal in a user equipment of a multi-antenna wireless communication system and the device for the same according to the present invention have been described based on the 3GPP LTE system, the present invention may be applied to various multi-antenna wireless communication systems in addition to the 3GPP LTE system.

The invention claimed is:

1. A method for receiving a downlink signal using a user equipment specific reference signal from a base station at a user equipment in a MIMO (Multi Input Multi Output) wireless communication system, the method comprising:
   receiving a downlink control signal including information on a number of antenna ports for the user equipment specific reference signal;
   receiving a downlink data signal; and
   decoding the downlink data signal based on the antenna ports,
   wherein indexes of the antenna ports are assigned continuously, and
   wherein a maximum number of the antenna ports for the user equipment specific reference signal is 8 and a size of the information on the number of antenna ports is 3 bits.

2. The method according to claim 1, wherein a number of layers for the downlink data signal is same with the number of antenna ports for the user equipment specific reference signal.

3. The method according to claim 1, wherein a number of layers for the downlink data signal is maximum 2.

4. The method according to claim 1, wherein the downlink control signal is carried on a physical downlink control channel (PDCCH), and the downlink data signal is carried on a physical downlink shared channel (PDSCH).

5. The method according to claim 1, wherein the number of antenna ports for the user equipment specific reference signal indicates a number of layers for the downlink data signal.

6. A user equipment in a multi user MIMO (MU-MIMO) wireless communication system, the user equipment comprising:
   a receiving module for receiving a downlink control signal including information on a number of antenna ports for the user equipment specific reference signal and for receiving a downlink data signal; and
   a processor for decoding the downlink data signal based on the antenna ports,
   wherein indexes of the antenna ports are defined continuously, and
   wherein a maximum number of the antenna ports for the user equipment specific reference signal is 8 and a size of the information on the number of antenna ports is 3 bits.

7. The user equipment according to claim 6, wherein a number of layers for the downlink data signal is same with the number of antenna ports for the user equipment specific reference signal.

8. The user equipment according to claim 6, wherein a number of layers for the downlink data signal is maximum 2.

9. The user equipment according to claim 6, wherein the downlink control signal is carried on a physical downlink control channel (PDCCH), and the downlink data signal is carried on a physical downlink shared channel (PDSCH).

10. The user equipment according to claim 6, wherein the number of antenna ports for the user equipment specific reference signal indicates a number of layers for the downlink data signal.

* * * * *